(12) United States Patent
Zhang et al.

(10) Patent No.: US 9,635,271 B2
(45) Date of Patent: Apr. 25, 2017

(54) VISION-BASED SCENE DETECTION

(75) Inventors: Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1533 days.

(21) Appl. No.: 13/298,615

(22) Filed: Nov. 17, 2011

(65) Prior Publication Data

US 2013/0128044 A1    May 23, 2013

(51) Int. Cl.
*H04N 7/18*    (2006.01)
*H04N 5/235*   (2006.01)
*G06T 7/00*    (2017.01)

(52) U.S. Cl.
CPC ............. *H04N 5/2351* (2013.01); *G06T 7/00* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2003/0205661 A1* | 11/2003 | Schofield | B60N 2/002 250/208.1 |
| 2008/0069400 A1* | 3/2008 | Zhu | G06K 9/3241 382/103 |
| 2008/0167810 A1* | 7/2008 | Wildervanck | G01C 21/34 701/431 |

* cited by examiner

*Primary Examiner* — Dakshesh Parikh
(74) *Attorney, Agent, or Firm* — Quinn IP Law

(57) ABSTRACT

A method of distinguishing between daytime lighting conditions and nighttime lighting conditions based on a captured image by a vision-based imaging device along a path of travel. An image is captured by a vision-based imaging device. A region of interest is selected in the captured image. A light intensity value is determined for each pixel within the region of interest. A cumulative histogram is generated based on light intensity values within the region of interest. The cumulative histogram including a plurality of category bins representing the light intensity values. Each category bin identifies an aggregate value of light intensity values assigned to each respective category bin. An aggregate value is compared within a predetermined category bin of the histogram to a first predetermined threshold. A determination is made whether the image is captured during the daytime lighting conditions as a function of the aggregate value within the predetermined category bin.

18 Claims, 4 Drawing Sheets

VISION-BASED SCENE DETECTION

BACKGROUND OF INVENTION

An embodiment relates generally to vehicle vision-based systems.

Vision-imaging systems are used in vehicles for enhancing sensing applications within the vehicle such as vehicle detection systems, clear path detection systems, lane centering, and other vision/positioning systems. Such systems utilize a light sensor for distinguishing a daylight condition from a nighttime condition. A light sensor is an added component that requires additional cost, wiring, and possible complexity.

Many systems in a vehicle may utilize such light sensing information to switch to a different mode of operation, or if the data obtained under the respective lighting conditions is not robust, then the system may switch to other techniques for carrying out the mode of operation. Various in-vehicle systems have been used to detect the lighting conditions; however, methods such as classifiers that determine a daytime or nighttime condition are complex and data intensive.

SUMMARY OF INVENTION

An advantage of an embodiment is distinguishing a daytime environment from a nighttime environment by analyzing images from an existing vehicle vision-based imaging device, which can eliminate a light sensor. The system can further distinguish a well-illuminated nighttime environment from a poorly illuminated environment. The system further identifies a daytime environment where a structure obstructs natural daylight in the captured image. This information can be used by various vehicle applications for actuating or switching operating modes that operate based on the lighting condition exterior of the vehicle, or may be inoperable when a signal blocking structure is present such as tunnel or under a bridge.

An embodiment contemplates a method of distinguishing between daytime lighting conditions and nighttime lighting conditions based on a captured image by a vision-based imaging device along a path of travel. An image is captured by a vision-based imaging device. A region of interest is selected in the captured image. A light intensity value is determined for each pixel within the region of interest. A cumulative histogram is generated based on light intensity values within the region of interest. The cumulative histogram includes a plurality of category bins representing the light intensity values. Each category bin identifies an aggregate value of light intensity values assigned to each respective category bin. An aggregate value is compared within a predetermined category bin of the histogram to a first predetermined threshold. A determination is made whether the image is captured during the daytime lighting conditions as a function of the aggregate value within the predetermined category bin.

DETAILED DESCRIPTION

Figure 1:
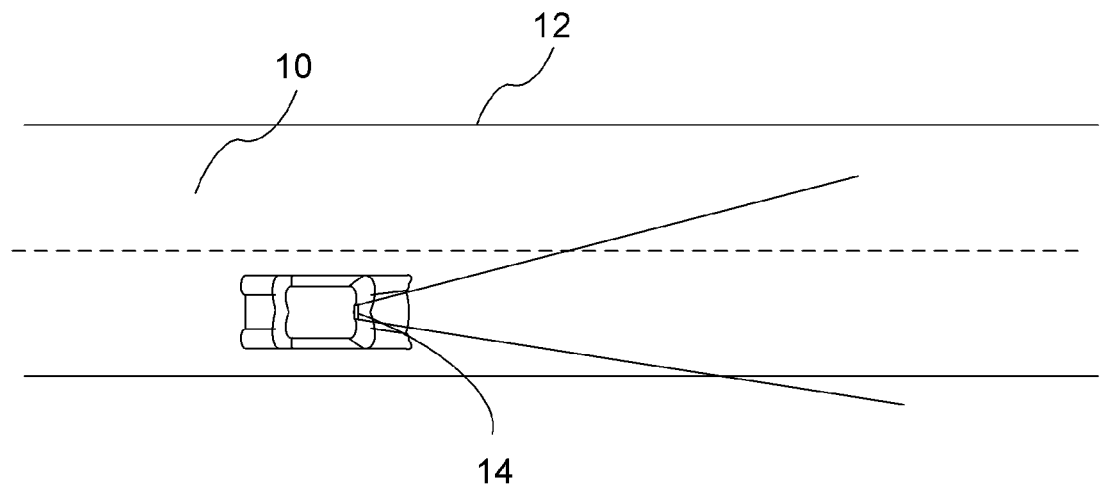
FIG. 1 is a plan view of a vehicle capturing an image of a road.

There is shown in FIG. 1, a vehicle 10 traveling along a road 12. A vision-based imaging device 14 captures images exterior of the vehicle 10 for detecting images along a path of travel. The vision-based imaging device may capture images in any region surrounding the vehicle, which includes, but is not limited to, images forward of the path of travel, images rearward of the path of travel, or images to a side of the path of travel. The vision-based imaging device 14 is mounted on the vehicle so that the desired region along the path of travel is captured. In the embodiment shown in FIG. 1, the vision-based imaging device 14 is mounted just behind the front windshield for capturing events occurring exterior and forward of the vehicle. The vision-based imaging device 14 is part of an existing system in the vehicle that is typically used for recognition of road marking, lane markings, road signs, or other roadway objects used in lane departure warning systems and clear path detection systems. In the embodiments disclosed herein, the captured images from the vision-based imaging device 14 are used to distinguish between a daytime lighting condition and a nighttime lighting condition. Moreover, the captured images are also used to distinguish between an obstructed daylight condition and an unobstructed daylight condition during the daytime, and also between a well-illuminated environment and a poorly illuminated environment during the nighttime. The identification of the daylight condition is provided to vehicle applications which actuate or switch operating modes based on the sensed lighting condition. As a result, the determination of the lighting condition eliminates the requirement of a light sensing device while utilizing existing vehicle equipment.

Figure 2:
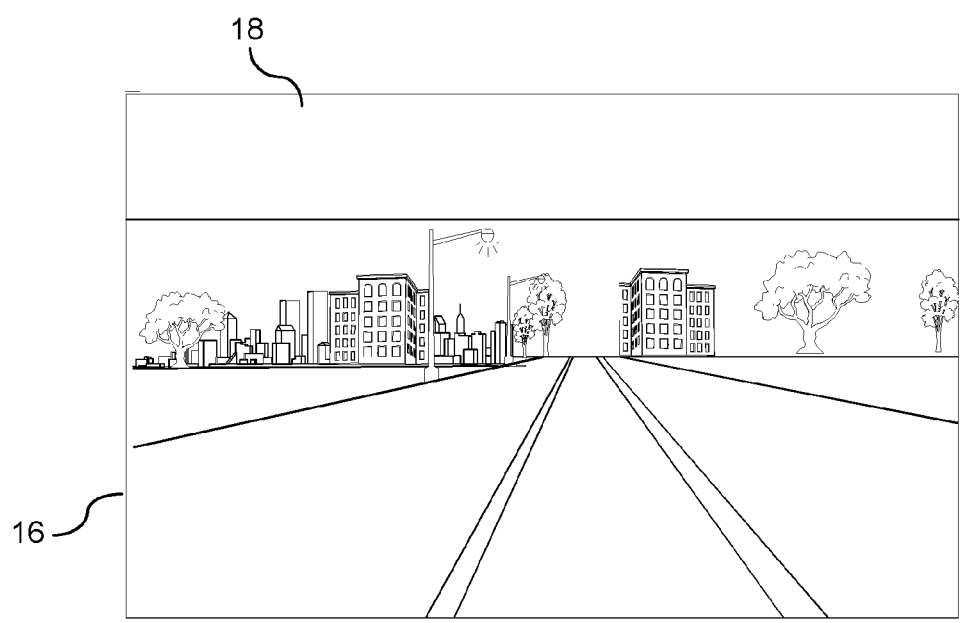
FIG. 2 is a view of an image by a captured by a vehicle vision-based imaging device.

FIG. 2 illustrates an image 16 captured by the vision-based imaging system on the vehicle. A region of interest 18 is selected within the image 16 for analyzing the lighting condition. A skyline is preferably selected as the region of interest 18 as the sky is the best indicator for determining the lighting condition. As a result, an upper portion of the image is selected for analyzing the lighting condition of the image. It should be understood that various software programs could be utilized for analyzing the image and selecting the region that would be best suited for detecting the lighting condition of the environment exterior of the vehicle.

The in-vehicle technique for determining a lighting condition exterior of the vehicle utilizes thresholds as opposed to a classifier which adds complexity within a vehicle and is data intensive; however, the technique may utilize a classifier during the training states for establishing the threshold. In the training mode, various images that include various lighting conditions are captured. In each image, a region of interest is identified that preferably relates to the skyline as shown in FIG. 2.

Figure 3:
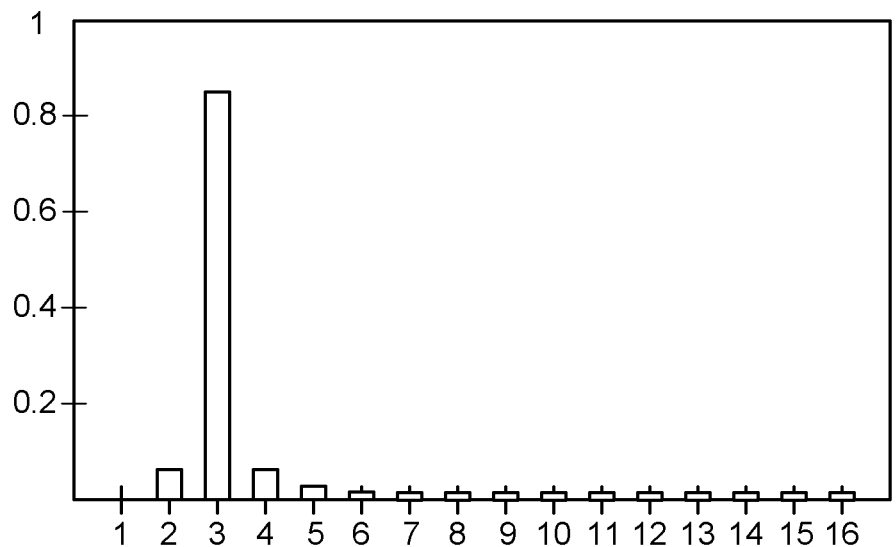
FIG. 3 is an example of an intensity histogram.

For each image captured, an intensity histogram is generated. FIG. 3 illustrates an example of an intensity histogram. The region of interest of a respective image is analyzed. The image is produced from a plurality of pixels.

Each pixel within the region of interest has an associated light intensity value. Each of the light intensity values are represented within the histogram.

The histogram is segregated into a plurality of category bins. As shown in FIG. 3, there are sixteen category bins. Intensity values that are close in intensity to one another may be grouped together. For example, if there are 256 possible light intensity values that a single pixel may represent, then the histogram as illustrated in FIG. 3 is segregated into sixteen categories with sixteen light intensity values within each category bin. Referring to FIG. 3, the first category bin will include light intensity values 1-16, the second category bin will include 17-32, the third category bin will include 33-48, and so forth. As a result, each intensity value for each pixel within the region of interest is assigned to a category bin based on their respective category bin. The vertical axis of the histogram represents an aggregate value of the pixels within the respective range of light intensity values assigned to that category bin. The aggregate value may be an aggregate number, a percentage, or other representation that identifies the pixels assigned to that category bin.

Figure 4:
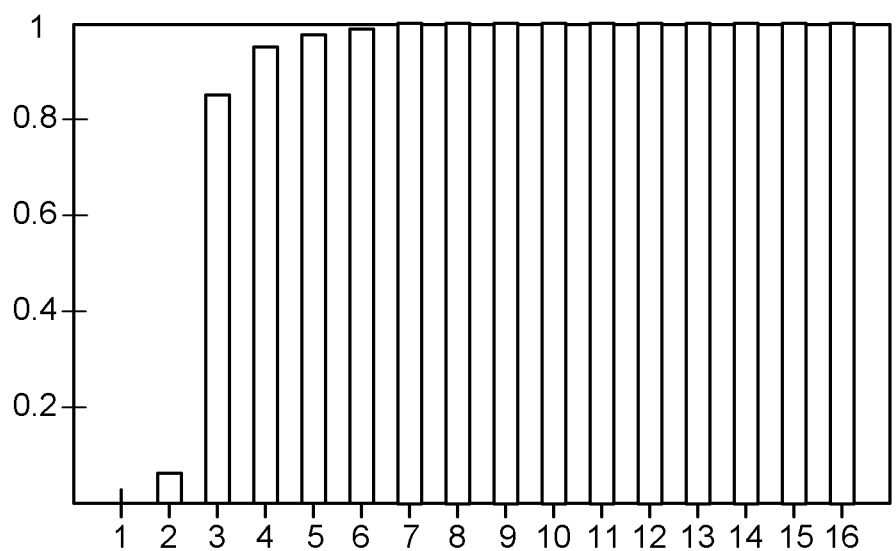
FIG. 4 is an example of a cumulative histogram.

After the intensity values for each pixel is assigned to a respective category bin, a cumulative histogram is generated based on the intensity histogram. An exemplary cumulative histogram is illustrated in FIG. 4. A respective cumulative histogram is generated for each image for identifying a respective category bin that best distinguishes a daytime lighting condition from a nighttime lighting condition. In addition, a respective category bin is identified that distinguishes obstructed daylight conditions from unobstructed daylight conditions, and well-illumination conditions from poor illumination conditions during the nighttime. Obstructed daylight conditions would include a path travel being driven under a structure that obstructs the daylight. Examples include, but are not limited to, tunnels and bridges.

As described earlier, a plurality of cumulative histograms are generated that represent both daytime lighting environments and nighttime lighting environments. The data from the cumulative histograms are provided to a feature selection routine for identifying the respective category bins that best distinguish between a daytime lighting condition and a nighttime lighting condition. An example of a feature selection routine includes, but is not limited to, a Kullback-Leibler divergence methodology that uses a non-symmetric measurement of the difference between two probability distributions. The objective of the routine is to collectively analyze each of the correlating category bins of the cumulative histograms and identify the respective category bin that best distinguishes the daytime lighting environment from the nighttime lighting environment. Once the respective category bin is identified, a first threshold is selected for identifying whether the image is obtained from a daytime environment or a nighttime environment. The aggregate value representing the light intensity value for the selected category bin is compared to the first threshold. If the aggregate value is less than the first threshold, then a determination is made that image is captured during a daytime lighting condition. Alternatively, if the aggregate value is greater than the first threshold, then the determination is made that the image is captured during a nighttime lighting condition.

Figure 5:
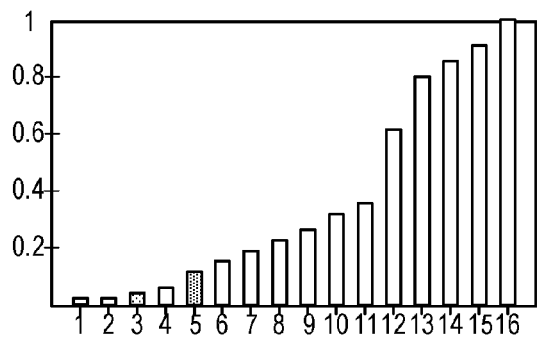
FIG. 5 is an exemplary cumulative histogram of a daylight lighting environment.
Figure 6:
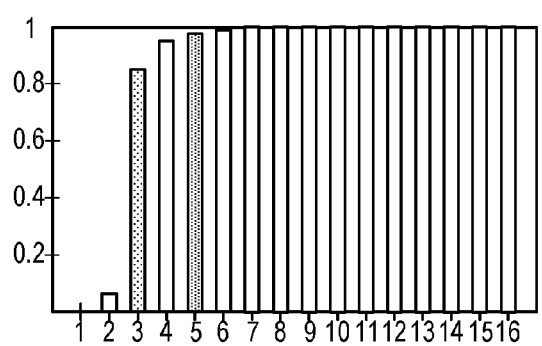
FIG. 6 is an exemplary cumulative histogram of a nighttime lighting environment.

FIGS. 5 and 6 illustrate respective cumulative histograms captured from images of both a daytime lighting environment and a nighttime lighting environment, respectively. A plurality of cumulative histograms may be used in the training mode for selecting the category bins and the thresholds. A feature selection program analyzes the cumulative histograms collectively and determines the respective category bin that best distinguishes daytime lighting environment from the nighttime lighting environment based on the cumulative histograms. In the examples shown, category bin 3 is selected and the first category bin by the feature selection routine for distinguishing between the daytime and nighttime environment. In addition, a first threshold value of (e.g., 0.2) is selected as the comparative value of the first category bin is compared to the aggregate value for determining whether the image is captured from the daytime lighting condition or the nighttime lighting condition.

To provide further details of the lighting condition, a second category bin is selected by the feature selection program that provides further insight on whether the natural daylight during a daytime condition is being obstructed, or whether image is well-illuminated during a nighttime lighting condition. The feature selection program analyzes the cumulative histograms of the training data and identifies the second category bin that will be used to distinguish the above mentioned conditions.

For a daytime lighting condition, a second threshold is generated for comparison with the aggregate value of the second category bin for determining whether the image includes a structure that obstructs the daylight. If the aggregate value of the second category bin is greater than the second threshold, then the determination is made that the captured image includes a daylight blocking structure. If the aggregate value of the second category bin is less than the second threshold, then the determination is that the captured image has unobstructed daylight conditions. As shown in FIG. 5, category bin 5 is identified as the second category bin. The second category bin is less than the second threshold. Therefore, the determination is made that there is no structure obstructing the daylight.

Figure 7:
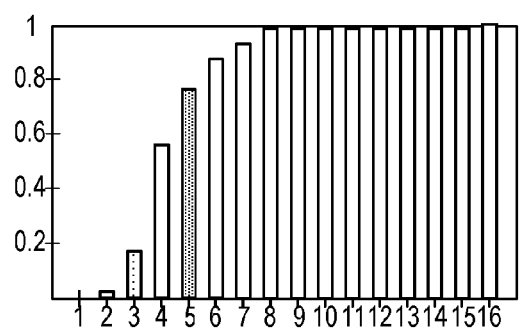
FIG. 7 is an exemplary cumulative histogram of a daytime lighting condition that identifies a daylight blocking structure.

Alternatively, FIG. 7 illustrates a daytime lighting condition that includes a structure obstructing the natural daylight. As shown in the histogram of FIG. 7, the aggregate value of the second category bin is less than the second threshold (e.g., 0.7), which indicates that a daytime lighting condition is present. However, the aggregate value of the second category bin is greater than the second threshold (e.g., 0.7). Therefore, the determination is made that the daylight blocking structures are present in the image.

For a nighttime lighting condition, the second category bin is used to determine whether the captured image is sufficiently illuminated during the nighttime condition. A third threshold is generated for comparison with the aggregate value of the second category bin for determining whether the image is sufficiently illuminated. If the aggregate value in the second category bin is less than the third threshold, then a determination is made that the image is sufficiently illuminated. If the aggregate value in the second category bin is greater than the third threshold, then a determination is made that the image is not well-illuminated. Referring FIG. 6, the fifth category bin is greater than the third threshold. Therefore, the determination is made that scene within the capture image is not well-illuminated.

Figure 8:
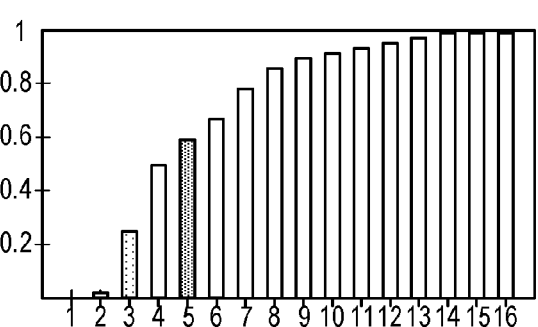
FIG. 8 is an exemplary cumulative histogram of a sufficiently illuminated nighttime lighting environment.

FIG. 8 illustrates nighttime lighting condition that is sufficiently illuminated by artificial lighting. Referring to the histogram, the third category bin is greater than the second threshold (e.g., 0.2). Therefore, the image is identified as a nighttime condition. The fifth category bin indicates that the aggregate value is less than third threshold (e.g. 0.7). Therefore, the determination is made that the scene in the captured image is sufficiently illuminated.

After the training mode is complete and the category bins and thresholds are identified, the routine may be implemented in the vehicle or any other apparatus that utilizes light sensing conditions. The advantage of the technique described herein, is that category bins and thresholds that are derived in a training mode are utilized in a vehicle real-time setting for identifying the daytime or nighttime mode as opposed to utilizing classifiers which are complex and often data intensive. By utilizing thresholds, the analysis can be performed in real-time and the results can be provided immediately to other vehicle applications which rely on light sensing analysis.

Figure 9:
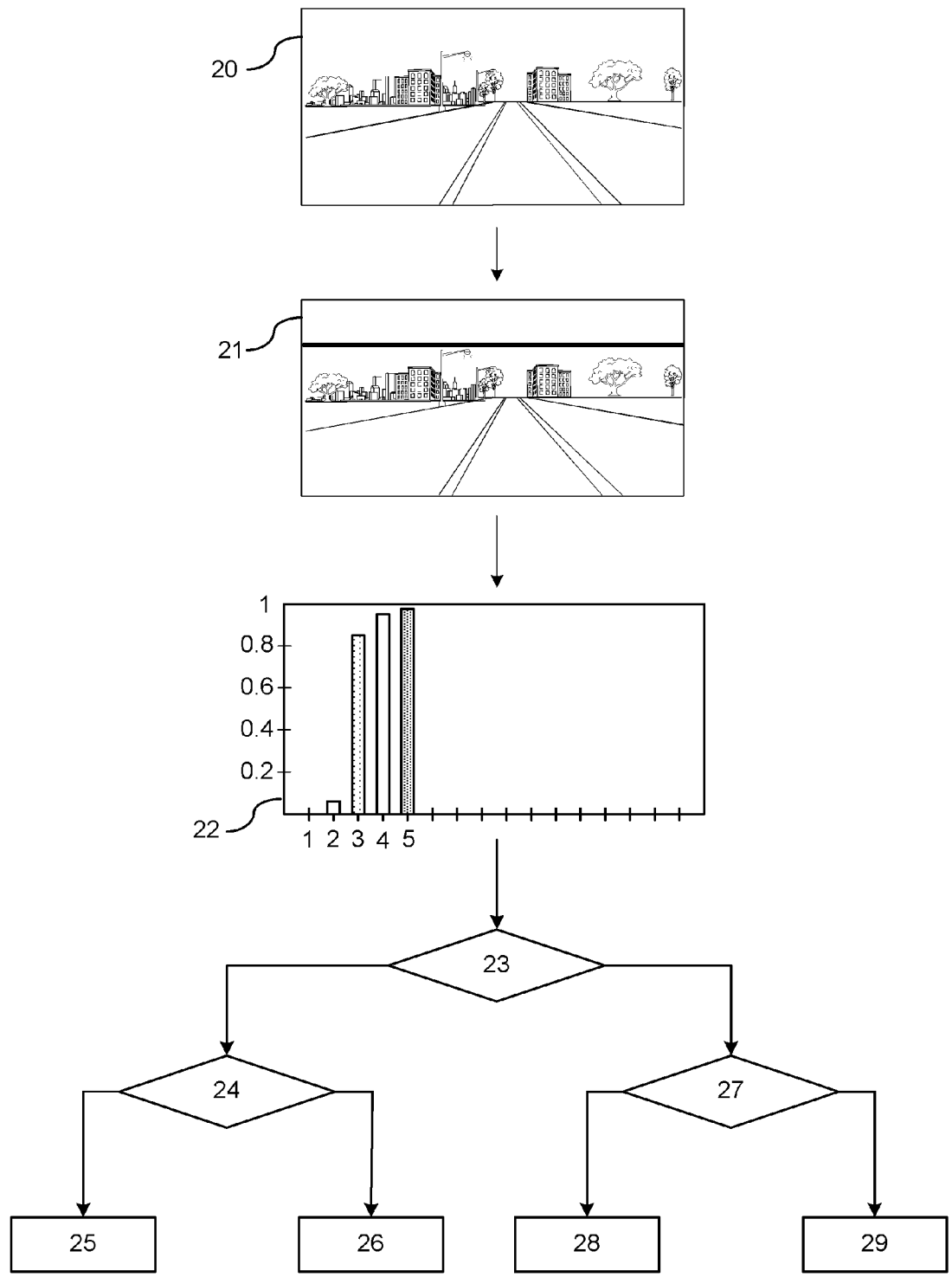
FIG. 9 is a flowchart of a method distinguishing between various lighting conditions.

FIG. 9 illustrates a flow diagram of the vision scene detection process applied in a vehicle. In block 20, a captured image is obtained from a vision-based imaging device mounted on the vehicle. The image depicts a view of the path of travel of the vehicle; however, the image is utilized for determining the daylight condition of the environment exterior of the vehicle.

In block 21, a region of interest is selected in the image. The region of interest is preferably a region that includes the skyline, which would provide the most information relating to the light conditions of the exterior environment.

In block 22, each pixel that comprises the region of interest is analyzed by identifying the light intensity value of each pixel. Based on a light intensity value, each pixel is assigned to a respective category bin that correlates to the light intensity value for generating a cumulative histogram. It should be understood that the all of the category bins are not required to be constructed in the cumulative histogram. Rather, only the respective category bins that include up to the second predetermined category bin are required. The reason for this is that remaining category bins beyond the second predetermined bin are not utilized. Therefore, the time to construct the histogram is reduced since none of the category bins beyond the second category bin is utilized. After the cumulative histogram is constructed, the first predetermined category bin (e.g., 3) and the second category bin (e.g., 5) are identified in the histogram.

In block 23, a determination is made as to whether the aggregate value representing the first category bin is greater than a first predetermined threshold. If the determination is made that first aggregate value is less than a first threshold, then a determination is made that a daytime lighting environment is present and the routine proceeds to block 24. If the determination is made that the first aggregate value is greater than the first threshold, then the determination is made that a nighttime lighting environment is present and the routine proceeds to block 27.

In block 24, a determination is made whether the second aggregate value is greater than a second threshold. If the second aggregate value is greater than the second threshold, then the routine proceeds to block 25. In block 25, the determination is made that the captured image includes a structure that obstructs daylight, and the vehicle outputs information regarding the obstructed daylight condition to other vehicle applications that can utilize this information accordingly. The pertinence of determining a structure that obstructs daylight is to assist a vehicle application in determining at what point in the road of travel is the obstruction expected. For example, Global Positioning System (GPS) or other Global Navigation Satellite System (GNSS) receivers operate by tracking line of sight signals. These receivers typically require at least four or more satellites to be continuously available in an unobstructed line of sight of a satellite receiver on a vehicle. Due to natural and man-made obstructions (e.g., bridge or tunnels), the theoretical minimum number of satellites required to accurately determine a position of the satellite receiver may not be available under certain conditions. When a vehicle GPS receiver loses communication with the respective satellites due to obstruction from such structures, other data and techniques may be used to compensate for location error increase as a result of poor GPS accuracy. As a result, it would be helpful to know approximately when the GPS signal will be lost due to the obstruction. What would be beneficial if the GPS receiver could be forewarned of the loss of signal, so that it could use alternative means for tracking the vehicle just before reaching the structure and while driving under the structure.

In another example, systems that utilize the light intensity of the exterior environment information (e.g., clear path detection) to adjust their operating mode to compensate for lack of illumination. Such systems can eliminate a light sensing device and utilize the information provided by the vision scene detection system.

Referring again to block 24, if the second aggregate value is less than the second threshold, then the routine proceeds to block 26. In block 26, no action is taken as the vehicle is traveling in a daytime light environment with no obstructions.

In block 27, in response to the determination being made that a nighttime lighting environment is present, a determination is made whether the second aggregate value is less than a third threshold. If the second aggregate value is less than the third threshold, then the routine proceeds to step 28. If the second aggregate threshold is greater than the third threshold, then the routine proceeds to step 29.

In step 28, in response to the second aggregate value being less than the third threshold, a determination is made that the nighttime lighting environment is sufficiently illuminated. The vision-based scene detection system outputs the lighting condition to the other vehicle applications to utilize accordingly.

In step 29, in response to the second aggregate value being greater than the third threshold, a determination is made that the nighttime lighting environment is includes insufficient lighting conditions. As a result, the vision-based scene detection system outputs the lighting condition to the other vehicle applications to utilize accordingly.

While certain embodiments of the present invention have been described in detail, those familiar with the art to which this invention relates will recognize various alternative designs and embodiments for practicing the invention as defined by the following claims.

What is claimed is:

1. A method of distinguishing between daytime lighting conditions and nighttime lighting conditions based on a captured image by a vision-based imaging device along a path of travel, the method comprising:
   capturing an image by a vision-based imaging device;
   selecting a region of interest in the captured image;
   determining a light intensity value for each pixel within the region of interest;
   generating a cumulative histogram based on light intensity values within the region of interest, the cumulative histogram including a plurality of category bins representing the light intensity values, each category bin identifying an aggregate value of light intensity values assigned to each respective category bin;
   comparing an aggregate value within a predetermined category bin of the plurality of category bins to a first predetermined threshold; and determining whether the image is captured during the daytime lighting conditions as a function of the aggregate value within the predetermined category bin, wherein determining whether the image is captured during the daytime lighting conditions is based on the aggregate value being less than a first predetermined threshold, and wherein determining whether the captured image is obtained during the daytime lighting conditions includes determining whether the captured image includes a daylight blocking structure over the path of travel.

2. The method of claim 1, wherein determining whether the captured image includes a daylight blocking structure over the path of travel comprises:

comparing a second aggregate value of the light intensity values within a second predetermined category bin of the plurality of category bins to a second predetermined threshold;

determining whether the second aggregate value is greater than the second predetermined threshold; and determining that the captured image includes the daylight blocking structure over the path of travel in response to the second aggregate value being greater than the second predetermined threshold.

3. The method of claim 2, wherein a result of determining that the captured image includes the daylight blocking structure over the path of travel is output to a global positioning system-based device, wherein the global positioning system-based device estimates a time when a loss of signal occurs in a global positioning system as a result of a vehicle traveling under the daylight blocking structure.

4. The method of claim 1, wherein the daylight blocking structure over the path of travel includes a tunnel over the path of travel.

5. The method of claim 1, wherein the daylight blocking structure over the path of travel includes a bridge over the path of travel.

6. The method of claim 1, further comprising determining that the captured image is obtained during the nighttime lighting conditions based on the aggregate value being greater than the first predetermined threshold.

7. The method of claim 6, wherein determining that the capture image is obtained during nighttime lighting conditions further comprises determining whether the nighttime lighting conditions include substantial lighting for illumination the path of travel in response to the aggregate value being greater than the first predetermined threshold, wherein determining an illumination of the path of travel comprises:

comparing a second aggregate value of a second predetermined category bin of the plurality of category bins to a third predetermined threshold;

determining whether the second aggregate value is less than the third predetermined threshold; and determining that the captured image includes the path of travel in the captured image is substantially illuminated in response to the second aggregate value being less than the third predetermined threshold.

8. The method of claim 1, wherein a result of determining whether the image is captured during the daytime lighting conditions is output to a vehicle-based module that enables vehicle operations based on environment light sensing.

9. The method of claim 8, wherein the vehicle-based module includes auto headlamps, and wherein the result output to the vehicle-based module is used to enable auto headlamps.

10. The method of claim 8, wherein the vehicle-based module includes a vehicle vision system, and wherein the result output to the vehicle-based module is used to modify the vehicle vision system.

11. The method of claim 1, wherein the region of interest represents an expected location of a skyline within the captured image.

12. The method of claim 1, wherein capturing an image by a vision-based imaging device includes capturing multiple images over a period of time, wherein the multiple images are cumulatively analyzed for detecting the daytime lighting conditions.

13. A method of distinguishing between daytime lighting conditions and nighttime lighting conditions based on a captured image by a vision-based imaging device along a path of travel, the method comprising:

capturing an image by a vision-based imaging device;

selecting a region of interest in the captured image;

determining a light intensity value for each pixel within the region of interest;

generating a cumulative histogram based on light intensity values within the region of interest, the cumulative histogram including a plurality of category bins representing the light intensity values, each category bin identifying an aggregate value of light intensity values assigned to each respective category bin;

comparing an aggregate value within a predetermined category bin of the plurality of category bins to a first predetermined threshold; and determining whether the image is captured during the daytime lighting conditions as a function of the aggregate value within the predetermined category bin, wherein capturing an image by a vision-based imaging device includes capturing multiple images over a period of time, wherein the multiple images are cumulatively analyzed for detecting the daytime lighting conditions, and wherein the multiple images are used to determine a transitioning region in a road of travel between an unobstructed daylight portion of the road of travel and an obstructed daylight portion of the road of travel.

14. A method of distinguishing between daytime lighting conditions and nighttime lighting conditions based on a captured image by a vision-based imaging device along a path of travel, the method comprising:

capturing an image by a vision-based imaging device;

selecting a region of interest in the captured image;

determining a light intensity value for each pixel within the region of interest;

generating a cumulative histogram based on light intensity values within the region of interest, the cumulative histogram including a plurality of category bins representing the light intensity values, each category bin identifying an aggregate value of light intensity values assigned to each respective category bin;

comparing an aggregate value within a predetermined category bin of the plurality of category bins to a first predetermined threshold; and determining whether the image is captured during the daytime lighting conditions as a function of the aggregate value within the predetermined category bin, wherein a training phase is used to identify which of the respective category bins of the cumulative histogram are selected as the predetermined category bin and a second predetermined category bin, the training phase including:

capturing a plurality of images of various lighting conditions;

selecting a region of interest for each captured image;

determining a light intensity value for each pixel within the region of interest for each captured image;

generating a cumulative histogram for each image based on the light intensity values within the region of interest, each cumulative histogram including a plurality category bins representing the light intensity values, each category bin identified by a comparative factor that is derived as function of the light intensity values assigned to each respective category bin;

identifying a first category bin from the plurality of histograms that distinguishes a daytime lighting condition from a nighttime lighting condition based on comparative factors, the first category bin being selected as the predetermined category bin; and identifying a second category bin from the plurality of histograms that distinguishes a daytime lighting condition having a daylight blocking structure from an unobstructed daytime lighting condition based on the comparative factors, the second category bin being selected as the second predetermined category bin.

15. The method of claim 14, wherein the predetermined category bin is determined by identifying a largest difference between a comparative factor of a respective category bin of a histogram associated with a daytime lighting condition and a comparative factor of a correlating category bin of a histogram associated with the nighttime lighting condition.

16. The method of claim 15, wherein the second predetermined category bin is determined by identifying a largest difference between a comparative factor of a respective category bin of a histogram associated with an unobstructed daylight condition and a comparative factor of a correlating category bin of a histogram associated with a daylight blocking structure.

17. The method of claim 14, wherein the predetermined category bin and the second predetermined category bin are selected using a feature selection technique.

18. The method of claim 14, wherein the comparative factor is an aggregate value of the light intensity values within a respective category bin.

* * * * *